Nov. 21, 1961 D. H. RUMBLE 3,009,636

DATA COMPARING SYSTEM

Filed Nov. 16, 1959 2 Sheets-Sheet 1

INVENTOR
DALE H. RUMBLE

BY P. Henninger

ATTORNEY

United States Patent Office
3,009,636
Patented Nov. 21, 1961

3,009,636
DATA COMPARING SYSTEM

Dale H. Rumble, Poughkeepsie, N.Y., assignor to International Business Machines Corporation, New York, N.Y., a corporation of New York Filed Nov. 16, 1959, Ser. No. 853,177
11 Claims. (Cl. 235—61.7)

This invention relates to a data retrieval system. More particularly, the invention relates to a simplified electrical system for comparing control or reference data with file data and for producing an output signal which may be usefully employed to segregate or otherwise identify file data in which agreement has been found.

The accumulation of vast amounts of scientific technical and statistical data has rendered difficult the retrieval and collection of such data on any particular subject. Substantial progress has been made in recent years toward abstracting, classifying and cataloguing data of the enumerated type and punched statistical cards have been found useful in the process. Systems have been devised for comparing files of punched cards having data abstracts thereon with specific questions or reference keys as to the data to be retrieved. Such systems usually operate to segregate file cards which respond to the questions or reference keys such that retrieval of specific data from a great mass of general data is greatly facilitated. The present invention relates to a system such as the foregoing.

It is, therefore, a purpose of the invention to provide a simplified system for effecting a comparison between a data comparison standard or reference key representing one or more questions to be answered by data contained in punched file cards, and for producing a control signal output upon agreement between the reference data and the file data, whereby all agreeing file data may be retrieved.

It is a particular object of the present invention to provide a simplified system by means of which a 1-to-1 comparison of data and no-data representing conditions can be obtained upon comparison of a line of reference data and a line of file data. As applied to a punched statistical card system, the invention utilizes simple comparison means for agreeing and non-agreeing hole and no-hole conditions in rows of a pair of punched cards being examined at the same time.

The invention is predicated on the concept that a simple current discriminating circuit may be employed as the principal novel component of the system such that a direct current may be employed to represent the presence of a data character and an alternating current may be employed to represent the absence of a data character, or vice versa. Resort to this concept results in the elimination of numerous electrical components heretofore required in data comparing systems, and permits the use of a very simple system composed of fewer components.

The invention, as stated, revolves around a current discriminating network which has a first and second output therefrom. The current discriminating network is energized from means adapted to indicate the absence or the presence of data against which a comparison is to be effected. This means may be a statistical punched card reader adapted to read the rows of a reference card therein, for example, or it may be composed of a network of hand set switches for simulating hole and no-hole data patterns. The reference data set-up means transmits an alternating current to the current discriminating network when no-data character representation is indicated and a direct current when the presence of a data character representation is indicated. The current discriminating network embodies a component adapted to pass only a direct current to the first of its outputs and it also embodies electrical interconnected components adapted to generate and transmit a direct current to its second output upon receiving an alternating current. By this method, two output points can be selectively energized depending on whether or not a data character manifestation is sensed at the reference position. The above described reference circuits are used in conjunction with a punched card reader having means under control of its reading brushes for selectively connecting the first and second outputs of the circuit discriminating network to an output signal circuit in response to the absence or presence of file card holes being sensed in the card reader. The circuit controlled by the card reader may be a relay circuit which moves a transfer blade into contact with one or the other of the discriminating circuit outputs. Alternately, the file card reader may also employ a current discriminating network like the one first described, such that corresponding outputs of the reference data discriminating network and the file card reader discriminating network can be used as inputs to a pair of coincidence circuits.

The details of the system, together with variations thereof, will be dealt with in the following description which is to be read in conjunction with the drawings in which like reference numerals indicate like parts, and in which.

Figure 1:
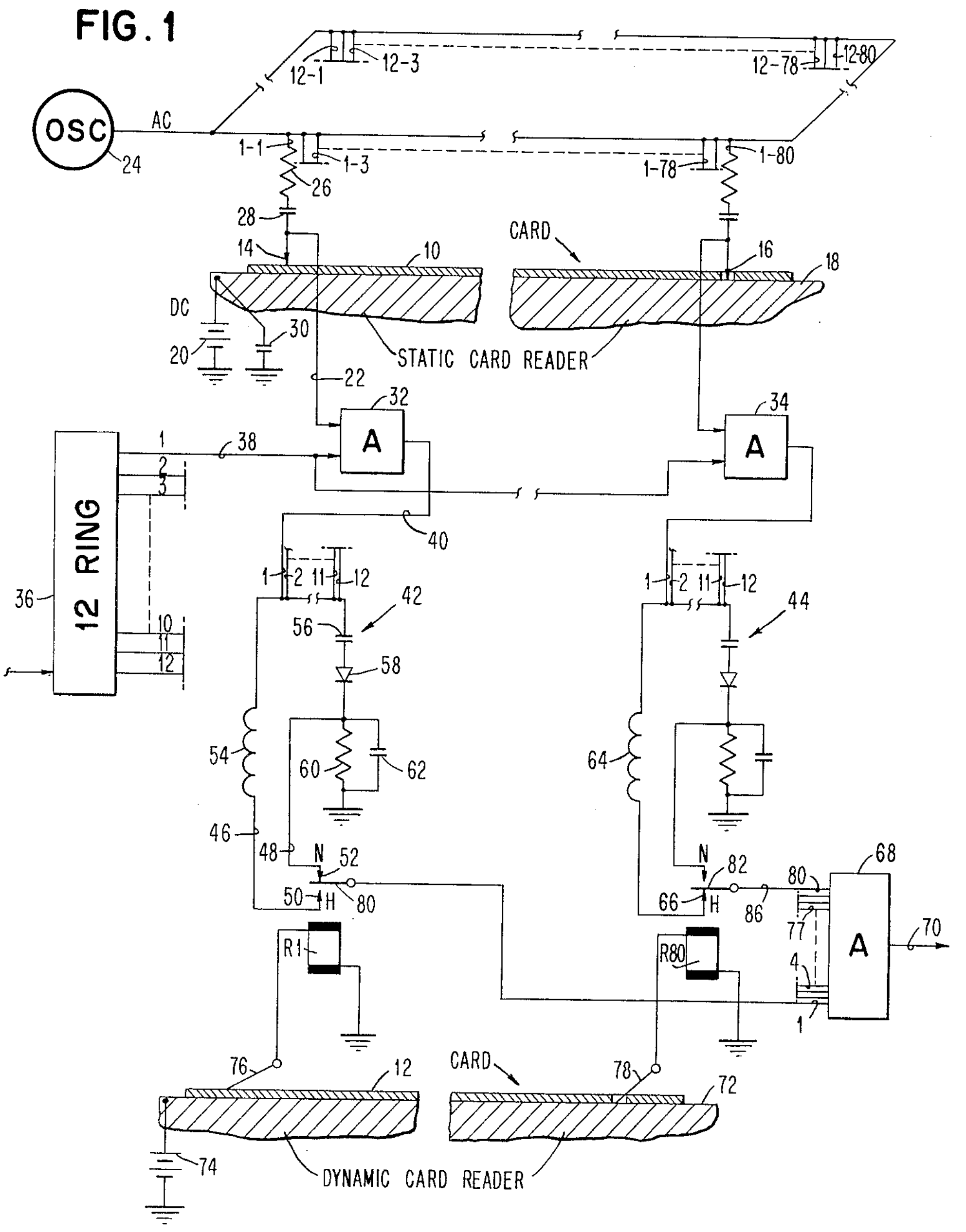
FIG. 1 is a diagrammatic illustration of a system adapted to compare each row of punched cards being read in a dynamic card reader against all of the rows of a reference card being read in a static card reader.

In FIG. 1, data in the several rows of a punched reference card 10 is being compared against each row of a punched file card 12. For purpose of explanation, it may be assumed that the card 10 has a different question punched in each of its twelve rows and that the card 12 may or may not have punched in each of its rows an answer to one or more of the questions represented in the card 10. The cards 10 and 12 may be conventional IBM statistical cards having twelve rows of index points disposed in 80 columns along the length of the card such that a hole may be punched at any desired index point for representing data in punched card form.

As represented in FIG. 1, the card 10 is disposed in a static card reader, i.e., a conventional device having 960 reading pins, like the pins 14 and 16 corresponding to the index point positions of the card, such that a reading pin will sense the presence or the absence of a hole at each index point of the card. Card readers of this type employ a bed plate 18 upon which is impressed a direct current voltage from any suitable source, such as a battery 20. Each of the reading pins is connected to an output circuit by means of connections 22, such that when a reading pin finds a hole in the card and makes contact with the charged bed plate 18, or a voltage is otherwise applied thereto, an output voltage will appear on the connection 22. Herein each of the reading pins is also connected to a source of alternating current such as that generated by an oscillator 24 which may, for example, have a 100 kc. output. The oscillator 24 impresses its output voltage on the reading pins by way of a resistance 26 and a condenser 28, and from thence to its output connection.

When a reading pin in the static card reader is insulated from the bed plate 18 by the card 10, it can be seen that the alternating current voltage will pass from the oscillator 24 through the resistance 26, the condenser 28, and into the output line 22.

The bed plate 18 has connected thereto a grounded condenser 30 which is effective to bleed off the alternating current voltage from the oscillator 24 whenever the reading pin comes into contact with the bed plate 18, such that the direct current from the source 20 will be available at the output lead 22. It can be seen, therefore, that when the alternating current signal is impressed on the output lead 22, it is indicative of the fact that the reading pin has found no hole in the card. On the other hand, the presence of a direct current on the output lead 22 is indicative of the fact that the reading pin has found a hole in the card.

Specifically, the reading pin 14, which herein represents the reading pin for the first row at the first column, is shown as being isolated from the bed plate 18 by the card between the pin and the bed plate. Under these conditions, the pin 14 is not affected by the direct current from the source 20 but it is affected by the alternating current from the oscillator 24, whereby the output lead 22 will have impressed thereon the alternating current signal. On the other hand, the reading pin 16, which herein represents the reading pin for the first row at the 80th column, extends through a hole in the card 10 and, therefore, is in contact with the bed plate 18. Alternating current voltage from the oscillator 24 will pass through the reading pin and will be grounded through the condenser 30, whereas the direct current voltage from the source 20 will pass from the bed plate 18 through the reading pin 16 and to its output lead such that a direct current signal is present on its output lead, thus indicating the presence of a hole in the card.

The reading pin outputs constitute inputs to associated AND circuits 32. While FIG. 1 shows two such AND circuits, it is to be understood that a similar circuit will be provided for each reading pin output. Thus, in FIG. 1, the AND circuit 32 is that which is connected to the reading pin 14 at the first column in the first row of the card, while the AND circuit 34 represents the one connected to the reading pin 16, which is that at the 80th column of the first card row. The AND circuits for each row are connected to a commutator 36 which is adapted to pulse the AND circuits in row-by-row order. A suitable commutator 36 is a closed stepping ring of interconnected bistable elements such as described at page 205 et seq. of Arithmetic Operations in Digital Computers, by R. K. Richards, published by D. Van Nostrand Company, Inc., 1955.

Since the card 10 is presumed to have twelve data rows therein, the commutator 36 will accordingly have twelve outputs. In FIG. 1, the output 38 of the commutator 36 is connected as a second input to each of the AND circuits associated with the first card row, these circuits being represented by the AND circuit 32 connected to the reading pin 14 of the AND circuit 34 connected to the reading pin 16. The successive higher commutator outputs will, of course, be connected respectively to the successive higher rows of AND circuits. It can be seen that as the commutator 36 steps from one position to another and a potential is successively impressed on the outputs, the commutator input to the rows of AND circuits will gate the voltage from the reading pins through the AND circuit rows in row-by-row order. It is intended, of course, that the cycle rate of the commutator 36 be such that it will scan all of the question card rows while a single row is being scanned in the dynamic card reader. This results in a comparison of all of the rows of card 10 with each of the rows of card 12.

Each of the AND circuits corresponding to a row of index point positions of the card 10 is connected to a discriminating circuit which selectively determines the hole or no-hole condition sensed by the reading pins of that particular row as the commutator 36 goes through its cycle. By reference to FIG. 1, it can be seen that the AND circuit 32 has an output 40 which is connected to a discriminating circuit 42. In like manner, the eleven remaining AND circuits which are associated respectively with the eleven remaining card rows in column 1 will also be connected to the discriminating circuit 42. The same arrangement holds true in respect to each of the remaining columns of the card 10 as indicated by the AND circuits 34 associated with the 80th column of the card 10 which, like the other AND circuits associated with that column, has an output connected to a discriminating circuit 44.

The discriminating circuits for all the card rows are identical and each, as by reference to the circuit 42, has two output legs 46 and 48; these legs being respectively connected to relay points 50 and 52. The relay point 50 when energized indicates that a hole has been sensed by the reading pin at that time connected into the discriminating circuit by the commutator 36. The contact 52, on the other hand, when energized, indicates that the reading pin then connected into the discriminating circuit by the commutator 36 has found no hole in the card. This device is relied on as a standard of comparison while reading the data file cards 12 in the dynamic card reader.

When the reading pin 14, for example, is insulated from the bed plate 18 of the static card reader, alternating current voltage from the oscillator 24 will pass through the resistance 26 and, by way of the condenser 38, will impress an alternating current voltage on the AND circuit 32. This potential is gated through the AND circuit by the commutator 36 when its output on the line 38 is high. Thus, the alternating current output of the AND circuit 32 will be impressed on the discriminating circuit 42 by way of the output lead 40. This voltage is blocked from reaching the output leg 46 by a choke coil 54 with the result that the current will pass through a condenser 56 and a rectifying diode 58 and appear as a direct current voltage across the RC network composed of a resistance 60 and a condenser 62. Thus, the no-hole contact 52 will be energized by way of the connection 48. It should be noted that if the AND circuit 32 has diode legs, then diode 58 can be eliminated as a rectifying device for the alternating current component.

Should a reading pin detect a hole in the card, as in the case of the reading pin 16, the voltage impressed on the AND circuit 34 will be the direct current voltage from the source 20. When the commutator 36 gates the voltage through the AND circuit 34 to its discriminating circuit 44, the voltage will pass only through a choke coil 64 and energize the hole contact 66 of the relay points.

If the transfer contacts of all of the relay points associated with a card row are so positioned as to complete a circuit from the energized relay points to an AND circuit 68, the output 70 of the AND circuit will have a signal thereon indicating that there is a complete hole, no-hole correspondence between the card rows being compared in cards 10 and 12. It remains to be seen, therefore, how the relay transfer points are controlled by the card 12 in the dynamic card reader to position the transfer points in accordance with the absence or the presence of a hole in card 12.

The dynamic card reader is of conventional form and includes a metal reading roller 72 which is connected to a direct current source such as a battery 74 which imposes a steady charge on the roller 72. The dynamic card reader includes a row of reading brushes, one for each of the 80 index point positions in a row in card 12. In FIG. 1, the reading brush 76 may be taken to represent the reading brush for the first card column while the reading brush 78 may be taken to represent the reading brush for the 80th card column. Each of the reading brushes is connected to an associated relay adapted to operate the aforementioned transfer contacts. Thus, the reading brush 76 is connected to the coil of a relay R1 which is adapted to control the position of the transfer point 80, while the reading brush 78 is connected to the coil of a relay R80 which is adapted to control the transfer point 82.

Assuming that the reading brush 76 is insulated from the reading roller 72 by the card 12, no current will flow to the relay R1 with the result that the transfer point 80 associated with the relay R1 is in its normally open position in which it lies in contact with the no-hole contact 52. This will result in an indication that there is a no-hole correspondence at that particular index point position of the cards 10 and 12. As explained before, under these conditions the no-hole contact 52 will be energized and an output signal will be transmitted from the relay point 52 via a connection 84 as one input to the AND circuit 68. Should, at the same time, the reading brush 78 sense a hole in the card 12, a hole correspondence will be indicated between the cards 10 and 12. Under these conditions, the relay R80 will be energized and it will attract the transfer point 82 such that it will contact the point 66 which, as explained, is the point which is energized through the discriminating circuit 44 by reason of a hole in the card 10. This results in an output potential on the connection 86 which is also an input to the AND circuit 68.

It can now be seen that if there is a hole, no-hole agreement at each of the 80 index point positions of the two rows of cards 10 and 12 which are being compared, each of the inputs to the AND circuit 68 will be energized and a resulting output signal on the output lead 70 will be produced. This signal may be utilized in a number of ways. For example, it may control a card sorter, whereby a card in the dynamic card reader will be segregated if it is determined to have a row correspondence with the card 10 in the static card reader.

Whenever there is a lack of hole, no-hole identity between two index point positions of the cards 10 and 12 being compared, there will be no input signal to the AND circuit 68 on the input line corresponding to that particular index point. Since the AND circuit requires a potential on each of its inputs in order to produce an output signal, no output signal will be produced on the output line 70. This will indicate, of course, that there is a lack of correspondence between the rows under examination. More specifically stated by way of illustration in respect to FIG. 1, and assuming that the reading pin 14 is insulated from the bed plate 18 by the card 10 which is the condition when no-hole is present, the alternating current from the oscillator 24 will pass through the reading pin circuit, through the AND circuit 32 and into the discriminating circuit 42 where the current is rectified and appears as a direct current voltage on the no-hole relay point 52, all as previously described. Let it be assumed that the reading brush 76 of the dynamic card reader under these conditions, in fact, finds a hole in the card 12 such that the brush comes into contact with the reading roller 72. This will complete a current path from the direct current source 74, such that the coil of the relay R1 is energized. Energization of the relay coil will attract the transfer point 80 such that the same will contact the hole relay point 50. As explained, the relay point 50, under these conditions, is not energized and, therefore, no output signal will appear on the line 84 thereby blocking an output from the AND circuit 68.

Figures 2, 3:
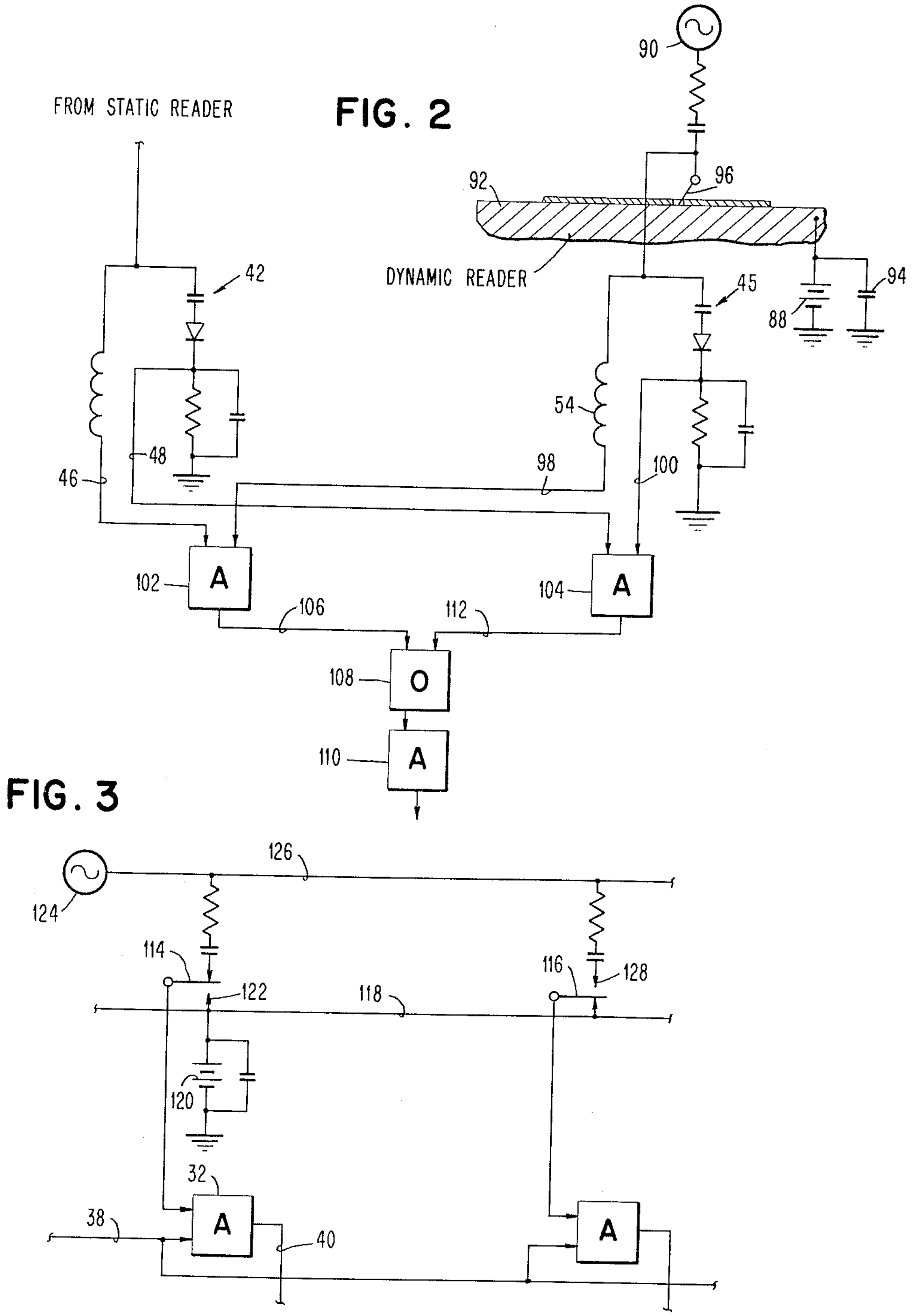
FIG. 2 is a diagrammatic illustration of a modification of the system of FIG. 1 wherein relay circuits of FIG. 1 are replaced by a second current discriminating circuit and in which coincidence circuits are employed to react to hole, no-hole agreement.
FIG. 3 is a fragmentary diagram of a hand set switch circuit adapted for use in lieu of the static card reader of FIG. 1.

The system of FIG. 1 has been adopted merely for the purpose of illustrating the voltage discrimination principle for data comparison and the details thereof are subject to wide variations. For example, the relays of the dynamic card reader may be replaced by a system of AND circuits such as shown in FIG. 2. Similarly, the static card reader may be replaced by a matrix of manually operated switches, such as shown in FIG. 3, whereby questions or reference data may be hand set.

In FIG. 2, the discriminating circuit 42 is energized from a static card reader, such as shown in FIG. 1, or alternately from a manual set switch system, such as shown in FIG. 3. In this case, however, the reading brushes of the dynamic card reader are each connected to an individual discriminating circuit which is the same as those connected to the reading pins of the static card reader. In FIG. 2, a discriminating network 45 is energized by the dynamic card reader either from a direct current source 88 or from an alternating current source 90. As explained in respect to FIG. 1, the output 46 of the discriminating circuit 42 will be energized when a hole is found in the card of the static card reader and the output 48 thereof will be energized when no hole is detected. In FIG. 2, the dynamic card reader operates electrically in the same way as the static card reader of FIG. 1, i.e., the alternating current voltage from the source 90 will be dissipated through a reading roller 92 and a condenser 94 in the case of a card hole, while the direct current voltage from the source 88 will energize a reading brush 96 such that the direct current thereon will be transmitted to the discriminating circuit 45. As before, this voltage will be passed by the choke coil 54 and appear as a hole signal on the output 98 of the discriminating circuit. At the same time, the potential on the second output 100 is low. The output leads 46 and 98 indicative of corresponding holes in the two cards constitute inputs to an AND circuit 102, while the no-hole outputs 48 and 100 constitute inputs to an AND circuit 104. It can be seen, therefore, that if both the dynamic and static card readers sense a hole at the corresponding location of cards under comparison, a pair of input signals will be available to the AND circuit 102. This AND circuit will, therefore, emit an output signal on its output line 106 to indicate the corresponding presence of card holes. This output signal is passed through an OR circuit 108 whose output is an input to a terminal AND circuit 110 which is the same as the AND circuit 68 of FIG. 1.

By the same token, if no holes are sensed in the corresponding card position, the outputs 48 and 100 of the discriminating circuits 42 and 45, respectively, will transmit a signal to the AND circuit 104 such that an output will be produced on its output lead 112 which is also an input to the OR circuit 108, and which OR circuit passes an output to the common terminal AND circuit 110.

Hand set switches, such as the switches 114 and 116 of FIG. 3, may be used in lieu of the static card reader of FIG. 1, as stated. It is contemplated that one or more rows of hand set switches may be provided so that one or more questions can be represented by the setting of the switches. In FIG. 3, only two switches of a single row have been illustrated. It will be understood, of course, that 80 such switches will be provided for each row of switches employed, thus producing an index point correspondence with the rows of the cards being scanned in the dynamic card reader. By resort to the hand set switches, the interrogating capacity of the system is not limited to the number of rows of a question or reference card, but a greater number may be provided if it is so desired. To increase in excess of twelve the number of question rows in a system employing the concept of FIG. 3 would require only the addition of AND circuits for the rows in excess of twelve, and an increase in the output stages of the commutator 36 to correspond to such excess number.

In FIG. 3, a conductor 118 is equivalent to the bed plate 18 of FIG. 1. This conductor is constantly energized from a direct current source 120 whereby direct current is impressed on the contacts 122. An alternating current source 124, such as the oscillator in FIG. 1, impresses its output on a conductor 126 such that an alternating current potential appears on switch points 128. Consequently, when switch contacts, such as the contacts 114, 116, are turned to make contact with the switch points 128, their associated AND circuits 32 will have impressed thereon an alternating current potential via a connection 130 thereby representing a no-hole condition. On the other hand, if the switch blades are turned into contact with the switch points 122, the output leads 130 and consequently the AND circuits 32 will have impressed thereon a direct current potential representative of a hole condition. In either case, a voltage appears on the output connection 40 which, as seen in FIG. 1, is connected to the discriminating circuit which operates, as previously explained.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a data retrieval system, a current discriminating network having a first and second output therefrom, means for indicating the absence or the presence of data against which a comparison is to be effected, an electrical connection between said indicating means and said discriminating circuit, means for effectively connecting a source of alternating current to said indicating means and said connection therebetween and said discriminating circuit when no data is indicated by said indicating means, means for effectively connecting a source of direct current to said indicating means and said connection therebetween and said discriminating circuit when data is indicated by said indicating means, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, and means under control of said detecting means in said card reader for selectively connecting said first and second outputs to an output signal circuit in response to the absence or presence of a card hole being sensed thereby.

2. In a data retrieval system, a plurality of current discriminating networks each having a first and second output therefrom, a plurality of means for indicating the absence or the presence of data against which a comparison is to be effected, an electrical connection between each of said indicating means and one of said discriminating circuits, means for effectively connecting a source of alternating current to said indicating means and said connections therebetween and said discriminating circuits when no data is indicated by said indicating means, means for effectively connecting a source of direct current to said indicating means and said connections therebetween and said discriminating circuits when data is indicated by said indicating means, an electrical component in each of said discriminating circuits adapted to pass only a direct current to said first output, electrically interconnected components in each of said discriminating circuits adapted to transmit only an alternating current to said second outputs as a direct current, a punched card reader, means in said card reader for detecting the absence or presence of a hole in a punched card being read therein, means under control of said detecting means in said card reader for selectively connecting said first and second outputs to an output signal circuit in response to the absence or presence of card holes being sensed thereby, and a coincidence circuit having as inputs thereto all of said output signal circuits.

3. In a data retrieval system, a current discriminating network having a first and second output therefrom, a manual switch for indicating the absence or the presence of data against which a comparison is to be effected, an electrical connection between said switch and said discriminating circuit, means for effectively connecting a source of alternating current to said switch and said connection therebetween and said discriminating circuit when no data is indicated by said indicating means, means for effectively connecting a source of direct current to said switch and said connection therebetween and said discriminating circuit when data is indicated by said indicating means, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, and means under control of said detecting means in said card reader for selectively connecting said first and second outputs to an output signal circuit in response to the absence or presence of a card hole being sensed thereby.

4. In a data retrieval system, a current discriminating network having a first and second output therefrom, means for indicating the absence or the presence of data against which a comparison is to be effected, an electrical connection between said indicating means and said discriminating circuit, means for effectively connecting a source of alternating current to said indicating means and said connection therebetween and said discriminating circuit when no data is indicated by said indicating means, means for effectively connecting a source of direct current to said indicating means and said connection therebetween and said discriminating circuit when data is indicated by said indicating means, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, a relay under control of said detecting means in said card reader for selectively connecting said first and second outputs to an output signal circuit in response to the absence or presence of a card hole being sensed thereby.

5. In a punched card data comparison system, a current discriminating network having a first and second output therefrom, a first card reader, means in said first card reader for detecting the absence or the presence of a hole in a punched card, an electrical connection between said detecting means and said discriminating circuit, means for effectively connecting a source of alternating current to said detecting means and said connection therebetween and said discriminating circuit when no hole is detected in a punched card by said detecting means, means for effectively connecting a source of direct current to said detecting means and said connection therebetween and said discriminating circuit when a hole is detected in a punched card by said detecting means, an electrical component in said discriminating circuit adapted to pass only a direct current to said first output, electrically interconnected components in said discriminating circuit adapted to transmit only an alternating current to said second output as a direct current, a second card reader, means in said second card reader for detecting the absence or presence of a hole in a punched card being read therein, and a relay under control of said detecting means in said second card reader for selectively connecting said first and second outputs to an output signal circuit in response to the absence or presence of a card hole being sensed thereby.

6. In a punched card data comparison system, a current discriminating network having a first and second output therefrom, a first card reader, means in said first card reader for detecting the absence or the presence of a hole in a punched card, an electrical connection between said detecting means and said discriminating circuit, means for effectively connecting a source of alterating current to said detecting means and said connection therebetween and said discriminating circuit when no hole is detected in a punched card by said detecting means, means for effectively connecting a source of direct current to said detecting means and said connection therebetween and said discriminating circuit when a hole is detected in a punched card by said detecting means, an electrical component in said discriminating circuit adapted to pass only a direct current to said first output, electrically interconnected components in said discriminating circuit adapted to transmit only an alternating current to said second output as a direct current, a second card reader, means in said second card reader for detecting the absence or presence of a hole in a punched card being read therein, and means under control of said detecting means in said second card reader for selectively connecting said first and second outputs to an output signal circuit in response to the absence or presence of a card hole being sensed thereby.

7. In a punched card data comparison system, a current discriminating network having a first and second output therefrom, a static card reader, means in said static card reader for detecting the absence or the presence of a hole in a punched card, an electrical connection between said detecting means and said discriminating circuit, means for effectively connecting a source of alternating current to said detecting means and said connection therebetween and said discriminating circuit when no hole is detected in a punched card by said detecting means, means for effectively connecting a source of direct current to said detecting means and said connection therebetween and said discriminating circuit when a hole is detected in a punched card by said detecting means, an electrical component in said discriminating circuit adapted to pass only a direct current to said first output, electrically interconnected components in said discriminating circuit adapted to transmit only an alternating current to said second output as a direct current, a dynamic card reader, means in said dynamic card reader for detecting the absence or presence of a hole in a punched card being read therein, and means under control of said detecting means in said dynamic card reader for selectively connecting said first and second outputs to n output signal circuit in response to the absence or presence of a card hole being sensed thereby.

8. In a punched card data comparison system, a current discriminating network having a first and second output therefrom, a hand set switch for selectively indicating the absence or the presence of data against which a comparison is to be effected, an electrical connection between said switch and said discriminating circuit, means for effectively connecting a source of alternating current to said switch and said connection therebetween and said discriminating circuit when no data is indicated by the setting of said switch, means for effectively connecting a source of direct current to said switch and said connection therebetween and said discriminating circuit when the presence of data is indicated by the setting of said switch, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, and means under control of said detecting means in said second card reader for selectively connecting said first and second outputs to an output signal circuit in response to to the absence or presence of a card hole being sensed thereby.

9. In a data retrieval system, a current discriminating network having a first and second output therefrom, means for indicating the absence or the presence of data against which a comparison is to be effected, an electrical connection between said indicating means and said discriminating circuit, means for effectively connecting a source of alternating current to said indicating means and said connection therebetween and said discriminating circuit when no data is indicated by said indicating means, means for effectively connecting a source of direct current to said indicating means and said connection therebetween and said discriminating circuit when data is indicated by said indicating means, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, a second current discriminating network having a first and second output therefrom, an electrical connection between said detecting means and said second discriminating circuit, means for effectively connecting a source of alternating current to said detecting means and said connection therebetween and said second discriminating network when no card hole is detected by said detecting means, means for effectively connecting a source of direct current to said detecting means and said connection therebetween and said second discriminating network when a card hole is detected by said detecting means, an electrical component in said second discriminating network adapted to pass only a direct current to said first output thereof, electrically interconnected components in said second current discriminating network adapted to transmit only an alternating current to said second output thereof as a direct current, a first coincidence circuit having as inputs thereto said first outputs of said current discriminating networks, and a second coincidence circuit having as inputs thereto said second outputs of said current discriminating networks.

10. In a data retrieval system, a current discriminating network having a first and second output therefrom, a manual switch for indicating the absence or the presence of data against which a comparison is to be effected, an electrical connection between said switch and said discriminating circuit, means for effectively connecting a source of alternating current to said switch and said connection therebetween and said discriminating circuit when no data is indicated by said switch, means for effectively connecting a source of direct current to said switch and said connection therebetween and said discriminating circuit when data is indicated by said switch, an electrical component in said discriminating circuit adapted to pass only a direct current to said first output, electrically interconnected components in said discriminating circuit adapted to transmit only an alternating current to said second output as a direct current, a punched card reader, means in said card reader for detecting the absence or presence of a hole in a punched card being read therein, a second current discriminating network having a first and second output therefrom, an electrical connection between said detecting means and said second discriminating circuit, means for effectively connecting a source of alternating current to said detecting means and said connection therebetween and said second discriminating network when no card hole is detected by said detecting means, means for effectively connecting a source of direct current to said detecting means and said connection therebetween and said second discriminating network when a card hole is detected by said detecting means, an electrical component in said second discriminating network adapted to pass only a direct current to said first output thereof, electrically interconnected components in said second current discriminating network adapted to transmit only an alternating current to said second output thereof as a direct current, a first coincidence circuit having as inputs thereto said first outputs of said current discriminating networks, and a second coincidence circuit having as inputs thereto said second outputs of said current discriminating networks.

11. In a data retrieval system, a current discriminating network having a first and second output therefrom, a first punched card reader, means in said first card reader for detecting the absence or the presence of a hole in a punched card, an electrical connection between said detecting means and said discriminating circuit, means for effectively connecting a source of alternating current to said detecting means and said connection therebetween and said discriminating circuit when no card hole is detected by said detecting means, means for effectively connecting a source of direct current to said detecting means and said connection therebetween and said discriminating circuit when a card hole is detected by said detecting means, an electrical component in said discriminating circuit adapted to pass only a direct current to said first output, electrically interconnected components in said discriminating circuit adapted to transmit only an alternating current to said second output as a direct current, a second punched card reader, means in said second card reader for detecting the absence or presence of a hole in a punched card being read therein, a second current discriminating network having a first and second output therefrom, an electrical connection between said last named detecting means and said second discriminating circuit, means for effectively connecting a source of alternating current to said last named detecting means and said connection therebetween and said second discriminating network when no card hole is detected by said detecting means, means for effectively connecting a source of direct current to said last named detecting means and said connection therebetween and said second discriminating network when a card hole is detected by said last named detecting means, an electrical component in said second discriminating network adapted to pass only a direct current to said first output thereof, electrically interconnected components in said second current discriminating network adapted to transmit only an alternating current to said second output thereof as a direct current, a first coincidence circuit having as inputs thereto said first outputs of said current discriminating networks, and a second coincidence circuit having as inputs thereto said second outputs of said current discriminating networks.

References Cited in the file of this patent

UNITED STATES PATENTS

| | | |
|---|---|---|
| 2,161,589 | Rabenda | June 6, 1939 |
| 2,714,201 | Whitehead | July 26, 1955 |
| 2,800,280 | Haynes | July 23, 1957 |